(12) United States Patent
Henne et al.

(10) Patent No.: US 6,353,783 B1
(45) Date of Patent: Mar. 5, 2002

(54) METHOD AND DEVICE FOR FORMING A DEPLOYMENT CRITERION FOR A RESTRAINT SYSTEM

(75) Inventors: Michael Henne, Zaberfeld; Lothar Groesch; Sigrid Hafner, both of Stuttgart; Torsten Baumann, Eppingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/555,200

(22) PCT Filed: Nov. 27, 1998

(86) PCT No.: PCT/DE98/03493

§ 371 Date: Aug. 30, 2000

§ 102(e) Date: Aug. 30, 2000

(87) PCT Pub. No.: WO99/28167

PCT Pub. Date: Jun. 10, 1999

(30) Foreign Application Priority Data

Nov. 29, 1997 (DE) .......................... 197 53 163

(51) Int. Cl.[7] .............................. B60R 21/32
(52) U.S. Cl. ..................... 701/45; 280/735; 180/282
(58) Field of Search .................. 701/45, 46, 47; 280/734, 735; 180/274, 282; 307/10.1; 340/436, 438; 73/862.041

(56) References Cited

U.S. PATENT DOCUMENTS

| | | | |
|---|---|---|---|
| 5,513,109 A | | 4/1996 | Fujishima .................. 280/735 |
| 5,608,628 A | * | 3/1997 | Drexler et al. .............. 280/734 |
| 5,673,365 A | | 9/1997 | Basehore et al. ........... 180/282 |
| 5,732,375 A | * | 3/1998 | Cashler ....................... 701/45 |
| 5,742,916 A | * | 4/1998 | Bischoff et al. .............. 701/45 |
| 5,821,633 A | * | 10/1998 | Burke et al. ................. 280/735 |
| 6,012,007 A | * | 1/2000 | Fortune et al. ............... 701/45 |
| 6,223,606 B1 | * | 5/2001 | Burke et al. ........... 73/862.041 |

FOREIGN PATENT DOCUMENTS

| | | |
|---|---|---|
| DE | 41 17 811 | 12/1992 |
| EP | 0 458 796 | 12/1991 |
| WO | WO/94 14638 | 7/1994 |

* cited by examiner

Primary Examiner—Gary Chin
(74) Attorney, Agent, or Firm—Kenyon & Kenyon

(57) ABSTRACT

A method and/or a device for forming a robust and reliable deployment criterion for a restraint system in a motor vehicle is formed with the help of a fuzzy classifier which receives at least two input quantities. The first input quantity is an operating time which begins when the measured acceleration exceeds a predetermined threshold; and a second input quantity takes into account the change in vehicle speed determined from the measured acceleration.

5 Claims, 2 Drawing Sheets

METHOD AND DEVICE FOR FORMING A DEPLOYMENT CRITERION FOR A RESTRAINT SYSTEM

FIELD OF THE INVENTION

The present invention relates to a method and a device for forming a deployment criterion for a restraint system in a motor vehicle, where the acceleration of the vehicle in one or more directions is measured, and a criterion is derived from the measured acceleration for deciding whether or not the restraint system should be deployed.

BACKGROUND OF THE INVENTION

A method is described in European Patent 458 796 in which, vehicle acceleration is first measured and then converted into a speed by integration over time. The deployment criterion is a threshold value which can be varied as a function of one or more state variables of the vehicle derived from the crash process. The restraint system is deployed when the measured vehicle speed exceeds this threshold. International Patent Application WO 94/14638 describes a method of forming a deployment criterion for a restrain system, where at least two deployment threshold values for the vehicle deceleration are given fuzzy definitions in a fuzzy method.

U.S. Pat. No. 5,673,365 describes a method where fuzzification of the vehicle acceleration is used to decide whether or not the vehicle has been involved in a crash.

The main requirement of a restraint system deployment algorithm is reliable deployment. This means that the restraint system is deployed in all crashes where there is a risk of injury to vehicle occupants. Conversely, this also means that it must not be deployed in a crash where deployment of the restraint system would not contribute toward a reduction in the risk of injury. It is essential that faulty deployment of the restraint system be prevented, because faulty deployment could result in frightening the driver and thus causing an accident or causing injury to a vehicle passenger due to the airbag itself. Faulty deployment must also be prevented because in some cases it is more expensive to replace an airbag after deployment than to repair the rest of the vehicle. In addition, the deployment algorithm should be as robust as possible. Robust is understood to refer to reliable deployment or nondeployment even in a crash not determined in advance by a crash test.

SUMMARY

An object of the present invention is to provide a method and a device for forming a deployment criterion for a restraint system that is as robust as possible.

According to the present invention a deployment criterion for deciding whether or not the restraint system should be deployed is formed with the help of a fuzzy classifier which receives at least two input quantities. A first input quantity is an operating time which begins when the measured acceleration exceeds a predetermined threshold, and a second input quantity takes into account the change in vehicle speed determined from the measured acceleration. A very robust and reliable decision can be made regarding whether or not the restraint system should be deployed by using the fuzzy method with the abovementioned input quantities.

In one refinement of the present invention the second input quantity is formed from the change in vehicle speed based on the operating time to provide a robust and reliable method.

A further improvement in the method and/or the device with regard to its robustness and reliability is obtained when the fuzzy classifier receives a third input quantity corresponding to an average slope of the measured acceleration.

DETAILED DESCRIPTION

Figure 1:
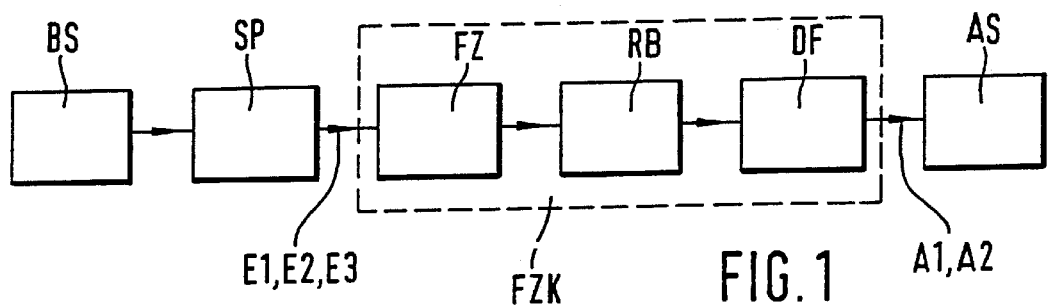
FIG. 1 is a block diagram of the device according to the present inventions.

FIG. 1 shows, to form a deployment criterion for a restraint system, the acceleration of a vehicle in one or more directions is measured by one or more acceleration sensors BS. The measured acceleration signal is sent to a downstream signal processor SP. The measured acceleration signal is filtered in signal processor SP to eliminate interference, and is then converted to a digital signal so that it can be processed further by a microcontroller. At least two input quantities E1, E2 for a fuzzy classifier FZK are derived in signal processor SP from the measured acceleration signal. In the embodiment illustrated here, a third input quantity E3 is additionally formed, but it is not necessary for the functioning of the method described here.

First input quantity E1 is an operating time i which begins when the measured acceleration exceeds a predetermined threshold. The threshold is set so that vehicle accelerations that are definitely not caused by a crash are disregarded when forming the deployment criterion.

Second input quantity E2 is the change in vehicle speed based on operating time i. This input quantity E2 is formed from sampled acceleration values according to the following procedure:

$$E2 = \frac{\sum_{j=0}^{i} a(j) \Delta t}{i},$$

where a(j) is the j-th sampled acceleration value, $\Delta t$ is the sampling time and i is the operating time.

Third input quantity E3 is an average of the measured acceleration which is formed according to the following procedure:

$$E3 = \frac{\frac{a(i)+a(i-1)}{2} - \frac{a(i-1)+a(i-2)}{2}}{\Delta t}$$

Input quantity E2, representing in principle the slope of the change in vehicle speed, and input quantity E3, corresponding to the average of the measured acceleration, are greatly attenuated in comparison with acceleration which is caused by a crash requiring repairs, driving over a pothole or driving over a curbstone, but must not lead to deployment of the restraint system.

Fuzzification takes place first in fuzzy classifier FZK, as indicated by unit FZ. In fuzzification, membership values to predetermined classes (also referred to as linguistic variables) are determined for each input quantity E1, E2, E3. Membership functions to input quantities E1, E2 and E3 are shown in FIGS. 2a, 2b and 2c.

Figure 2A:
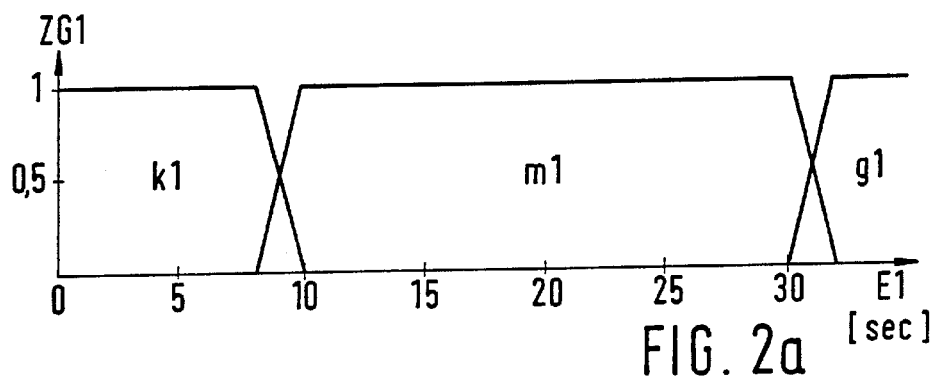
FIGS. 2a, 2b and 2c show membership functions of three input signals.

In FIG. 2a, input quantity E1 is divided into a class for low values k1, a class for medium values m1 and a class for high values g1. A degree of membership ZG1 of each value of input quantity E1 to individual classes k1, m1 and g1 can be determined from the ordinate of the coordinate system.

Figure 2B:
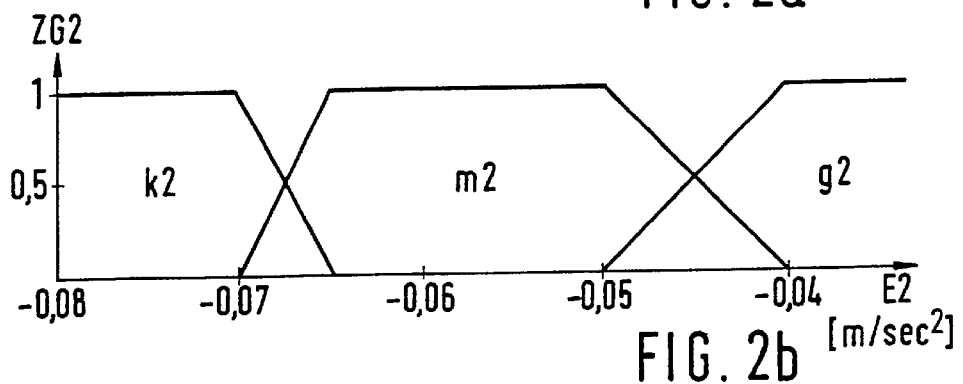

In FIG. 2b the membership function for input quantity E2 is also composed of three classes, one for lower values k2, one for medium values m2 and one for higher values g2. The degree of membership ZG2 of input quantity E2 to individual classes k2, m2 and G2 can be determined from the coordinate system.

Figure 2C:
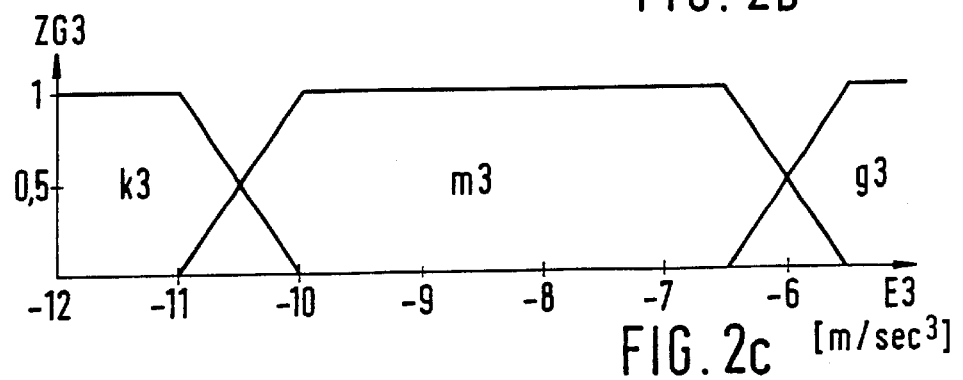

THE degree of membership ZG3 of third input quantity E3 likewise to three classes k3, m3 and g3 is shown in FIG. 2c.

The classification of classes for each input quantity, i.e., whose limits and leading edges at the limits are optimized according to a number of simulated types of crashes. Examples of the class curves of the three membership functions are shown for illustration in FIGS. 2a, 2b and 2c; they must be determined individually for each type of vehicle. It is simplest in terms of the computations if the intersecting leading and trailing edges of the individual classes are linear.

Control base RB is in second unit RB of fuzzy classifier FZK. Logic operation rules between individual input quantities E1, E2, E3 and their class membership are deposited in control base RB. With three input quantities and three classes per input quantity, there are 27 rules, as shown in the following tables. The control base is three-dimensional because of the three input quantities. To obtain a simple two-dimensional representation, it is divided into three partial control bases. Each of these three partial control bases stands for a class of input quantity E1. If a logic operation between input quantities E1, E2, E3 is to lead to deployment, a 1 is entered in the respective location in the partial control base; nondeployment is indicated by a 0. The rules are numbered by numbers in parentheses. The individual rules are illustrated below on the basis of the partial control bases.

Partial control base for E1→k1:

| E1 → k1 | E2 → k2 | E2 → m2 | E2 → g2 |
|---|---|---|---|
| E3 → k3 | 1 (1) | 1 (4) | 1 (7) |
| E3 → m3 | 1 (2) | 1 (5) | 1 (8) |
| E3 → g3 | 1 (3) | 1 (6) | 0 (9) |

Rule 1

The restraint system must be deployed if input quantity E3 belongs to class k3, input quantity E2 to class k2 and input quantity E1 to class k1. The deployment property has been based on the condition that input quantity E3 belongs to class k3 and input quantity E2 to class k2. Each of these two conditions justifies deployment. Thus, rules 2, 3, 4 and 7 also lead to deployment.

Rule 5

If input quantity E3 belongs to class m3, input quantity E2 to class m2 and input quantity E1 to class k1, deployment is necessary. The deployment property has in turn been based on the condition that input quantity E3 belongs to class m3 and input quantity E2 to class m2. If one of these two conditions is met, this also justifies deployment. Thus, deployment also occurs with rules 6 and 8.

Rule 9

With this rule, none of the deployment conditions described above is applicable, so they do not lead to deployment.

Partial control base for E1→m1:

| E1 → m1 | E2 → k2 | E2 → m2 | E2 → g2 |
|---|---|---|---|
| E3 → k3 | 1 (10) | 1 (13) | 1 (16) |
| E3 → m3 | 1 (11) | 1 (14) | 1 (17) |
| E3 → g3 | 1 (12) | 0 (15) | 0 (18) |

Rule 10

If input quantity E3 belongs to class k3, input quantity E2 to class k2 and input quantity E1 to class m1, deployment must occur. Thus, if the conditions of input quantity E3 belonging to class k3 and input quantity E2 belonging to class k2 are met, this justifies deployment. Thus, deployment must also occur with rules 11, 12, 13 and 16.

Rule 14

If input quantity E3 belongs to class m3, input quantity E2 belongs to class m2 and input quantity E1 belongs to class m1, deployment must occur. Thus, the condition of input quantity E3 belonging to class m3 leads to deployment. Thus, deployment must also occur with rule 17.

Rule 15

If input quantity E3 belongs to class g3, input quantity E2 belongs to class m2 and input quantity E1 belongs to class m1, deployment must not occur. Since none of the deployment conditions mentioned above (E3→k3, E3→m3 and E2→k2) is met, this is a nondeployment rule, just like rule 18.

Partial control base for E1→g1:

| E1 → g1 | E2 → k2 | E2 → m2 | E2 → g2 |
|---|---|---|---|
| E3 → k3 | 1 (19) | 1 (22) | 1 (25) |
| E3 → m3 | 1 (20) | 1 (23) | 1 (26) |
| E3 → g3 | 0 (21) | 0 (24) | 0 (27) |

Rule 19

If input quantity E3 belongs to class k3, input quantity E2 belongs to class k2 and input quantity E1 belongs to class g1, deployment must occur. The condition of input quantity E3 belonging to class k3 is responsible for deployment. Thus, rules 22 and 25 are also deployment rules.

Rule 20

If input quantity E3 belongs to class m3, input quantity E2 belongs to class k2 and input quantity E1 belongs to class g1, deployment must occur. Deployment here thus depends on the condition of input quantity E3 belonging to class m3. Thus, rules 23 and 26 are also deployment rules.

Rule 21

If input quantity E3 belongs to class g3, input quantity E2 belongs to class k2, and input quantity E1 belongs to class g1, deployment must not occur. The above-mentioned rules for deployment depended on the condition of input quantity E3 belonging to class k3 or input quantity E3 belonging to class m3. This condition is not met, and thus rule 21 as well as rules 24 and 27 are nondeployment rules.

Now, as is customary in fuzzy logic, degrees of validity are determined for all rules. The degree of validity of a rule is determined with a logic operator. The degrees of membership ZGE1, ZGE2, ZGE3 of input quantities E1, E2, E3 to the classes specified in the rules are at the inputs of the logic operator. Two conventional logic operators are the AND operator and the OR operator. The AND operator selects the minimum of the applied degrees of membership and the OR operator selects the maximum. Thus, there is a degree of validity between 0 and 1 for each rule. After the degrees of validity of all rules have been determined, the maximum interference method is used, i.e., the highest degree of validity of all deployment rules is selected, and likewise, the highest degree of validity of all nondeployment rules is selected.

Figure 3A:
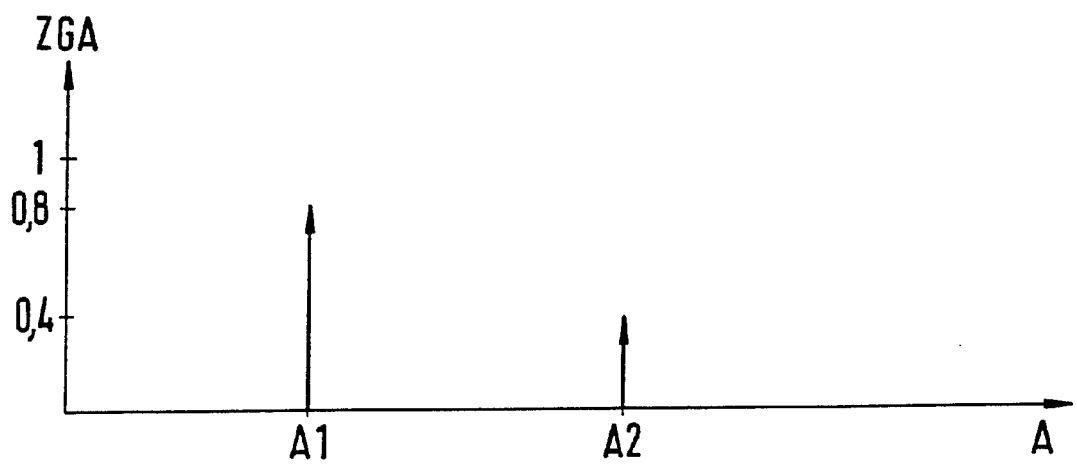
FIGS. 3a and 3b show two possible membership functions of the output signal of the fuzzy classifier.
Figure 3B:

Finally, defuzzification is performed in the fuzzy classifier as indicated by unit DF. For example, a very simple defuzzification is selected here, namely the singleton method. A membership function for output quantity A which is responsible for the restraint system being deployed or not is formed here. This output quantity is composed of singletons instead of continuous trapezoidal or triangular functions for the individual classes. A singleton is understood to be a discrete value pair which is composed here of two output classes A1 and A2 and degree of membership ZGEA. Output class A1 stands for nondeployment and output class A2 stands for deployment. The degree of validity of the nondeployment rules derived from forming the interference is transferred to degree of membership ZGA of output class A1, and the degree of validity of the deployment rules is transferred to degree of membership ZGA of output class A2. FIG. 3a shows an embodiment where output class A1 for nondeployment has a higher degree of membership than output class A2 for deployment, and FIG. 3b shows an example of the opposite case.

Finally, an analyzer circuit AS performs a comparison between the degrees of membership of output classes A1 and A2 and 35 decides for deployment when the degree of membership of output class A2 is greater than the degree of membership of output class A1, and it decides for nondeployment when the degree of membership of output class A1 is greater than the degree of membership of output class A2. Thus, in the examples shown in FIGS. 3a and 3b, there is no deployment in the case in FIG. 3a and there is deployment in the case in FIG. 3b.

Of course, instead of the simple singleton method, another conventional defuzzification method (e.g., the center of gravity method) may also be used.

What is claimed is:

1. A method of forming a deployment criterion for a restraint system in a motor vehicle, comprising:

measuring an acceleration of the vehicle; and deriving the deployment criterion as a function of the measured acceleration using a fuzzy method for deciding whether the restraint system should be deployed, the deriving step including forming the deployment criterion using a fuzzy classifier, the fuzzy classifier receiving at least two input quantities, a first one of the input quantities representing an operating time which begins when the measured acceleration exceeds a predetermined threshold, and a second one of the input quantities representing a change in vehicle speed based on the measured acceleration.

2. The method according to claim 1, wherein the second one of the input quantities is formed from sampled acceleration values according to the following equation:

$$E2 = \frac{\sum_{j=0}^{i} a(j) \Delta t}{i},$$

wherein E2 is the second one of the input quantities, a(j) is a j-th sampled acceleration value, $\Delta t$ is a sampling time and i is the operating time.

3. The method according to claim 1, wherein the fuzzy classifier receives a third input quantity representing an average of the measured accelerations.

4. The method according to claim 3, wherein the third input quantity is formed according to the following equation:

$$E3 = \frac{\frac{a(i)+a(i-1)}{2} - \frac{a(i-1)+a(i-2)}{2}}{\Delta t},$$

wherein E3 is the third input quantity, a(i), a(i−1) and a(i−2) are sampled acceleration values and $\Delta t$ is a sampling time.

5. A device for forming a deployment criterion for a restraint system in a motor vehicle, comprising:

a sensor that measures acceleration of the motor vehicle; and a fuzzy classifier that forms the deployment criterion, the fuzzy classifier receiving at least two input quantities, a first one of the input quantities representing an operating time which begins when the measured acceleration exceeds a predetermined threshold, and a second input quantity representing a change in vehicle speed determined as a function of the measured acceleration.

* * * * *